US006178261B1

(12) United States Patent
Williams et al.

(10) Patent No.: US 6,178,261 B1
(45) Date of Patent: Jan. 23, 2001

(54) METHOD AND SYSTEM FOR EXTRACTING FEATURES IN A PATTERN RECOGNITION SYSTEM

(75) Inventors: William J. Williams; Eugene J. Zalubas; Robert M. Nickel; Alfred O. Hero, III, all of Ann Arbor, MI (US); Jeffrey C. O'Neill, Chelmsford, MA (US)

(73) Assignee: The Regents of the University of Michigan, Ann Arbor, MI (US)

( * ) Notice: Under 35 U.S.C. 154(b), the term of this patent shall be extended for 0 days.

(21) Appl. No.: 08/906,253

(22) Filed: Aug. 5, 1997

(51) Int. Cl.[7] .............................. G06K 9/46; G06K 9/62
(52) U.S. Cl. ........................................... 382/190; 382/224
(58) Field of Search .................................. 382/169, 168, 382/159, 203, 181, 190, 191, 218, 224, 225, 276, 278, 197, 198; 704/250

(56) References Cited

U.S. PATENT DOCUMENTS

| 5,014,327 | * | 5/1991 | Potter et al. ........................ 382/220 |
| 5,412,589 | | 5/1995 | Williams et al. .................... 708/425 |

(List continued on next page.)

OTHER PUBLICATIONS

"Invariant Classification of Time Frequency Representations: Applications to Doppler Radar Target Identification", Wm. J. Williams and E.J. Zalubas.
University of Michigan AFOSR/DSTO Workshop on Defence Signal processing, Victor Harbor, South Australia, Jun. 1997, Reprint Nov. 26, 1997, pp. 1–29.
"Shift and ScaleInvariant Detection", E.J. Zalubas, J.C. O'Neill, Wm. J. Williams, A. O. Hero III., Proc. ICASSP–97 vol. 5, pp. 3637–3640.
"Separating desired image and signal invariant components from extraneous variations", W. J. Williams, E J. Zalubas, A. Hero III. SPIE vol. 2846, pp. 262–272.
"Word Spotting in Bitmapped Documents", W. J. Williams, E. J. Zalubas, A.O. Hero, III. University of Michigan, Proceed.SDIUT97, Annapolis, MD., Apr. 30–May 2, 1997, pp. 214–227.

(List continued on next page.)

Primary Examiner—Bhavesh Mehta
(74) Attorney, Agent, or Firm—Brooks & Kushman P.C.

(57) ABSTRACT

Method and system for extracting features from measurement signals obtained from real world, physical signals by first forming an invariant component of the measurement signals and then using a technique based on a noise subspace algorithm. This technique first casts or projects the transformed measurement signals into separate subspaces for each extraneous variation or group of variations. The subspaces have minimal over-lap. The recognition of a particular invariant component within a pertinent subspace is then preferably performed using Singular Value Decomposition (SVD) techniques to generate a pattern recognition signal. A series of transformations can be used to form an invariant component called the Scale and Translation Invariant Representation (STIR). In one embodiment, the first step is to form an appropriate time-frequency representation such as the Reduced Interference Distribution (RID) or other distribution whose properties are covariant with translations in time and frequency and changes in scale. A series of additional transformations including a scale transform yield the STIR representation. Features are then extracted from a set of STIR representations taken as examples of the desired signal. The STIR approach removes much of the variation due to translation. In bit-mapped documents, the same translation invariant and scale invariant transformations may be made to regularize characters and words. Also, the same feature selection method functions in an image setting. The method has been found to be particularly useful in word spotting in bitmapped documents corrupted by faxing.

27 Claims, 4 Drawing Sheets

U.S. PATENT DOCUMENTS 5,497,430 * 3/1996 Sadovnik et al. .................... 382/156
5,574,639 * 11/1996 Qian et al. ....................... 364/724.01
5,754,681 * 5/1998 Watanabe et al. ................... 382/159
5,809,437 * 9/1998 Breed ..................................... 701/29

OTHER PUBLICATIONS

Pao et al. Shapes Recognition Using the Straight Line Hough Transform: Theory and Generalization. IEEE Transactions on Pattern Analysis and Machine Intelligence. vol. 14. pp. 1076–1089, Nov. 11, 1992.*

* cited by examiner

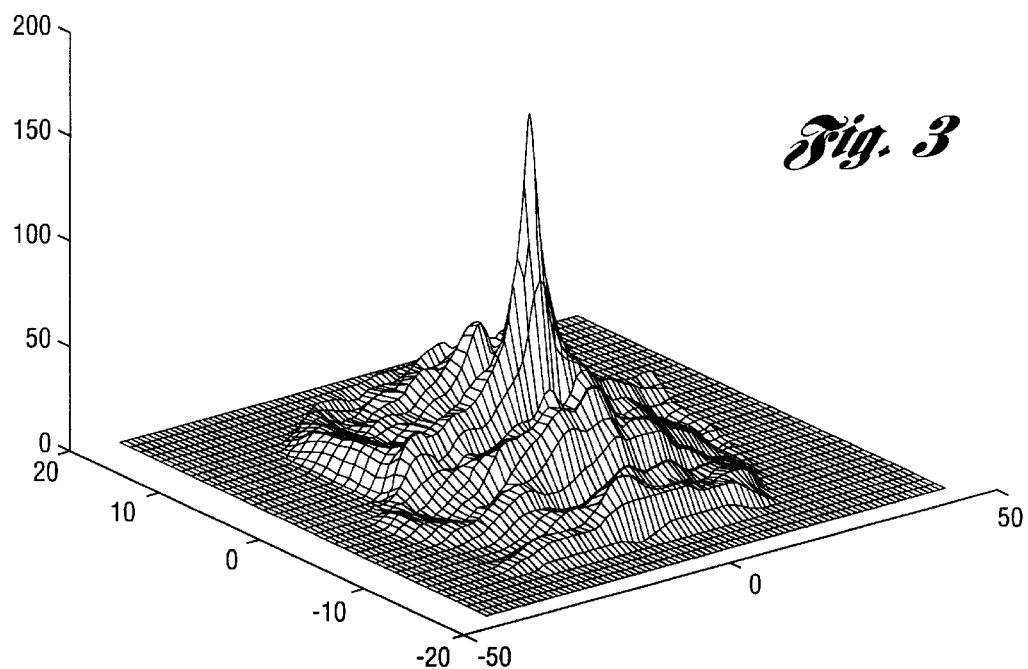
Fig. 3
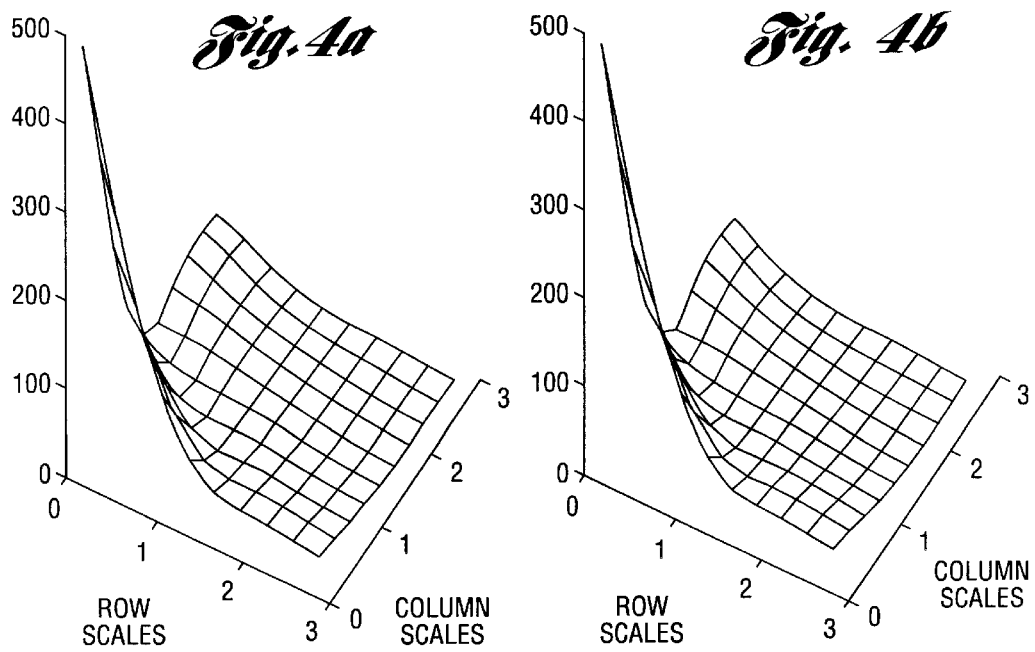
Fig. 4a
Fig. 4b

METHOD AND SYSTEM FOR EXTRACTING FEATURES IN A PATTERN RECOGNITION SYSTEM

GOVERNMENT RIGHTS

This invention was made with government support under contract MDA 904-95-C-2157 awarded by NSA. The government has certain rights in the invention.

TECHNICAL FIELD

This invention relates to methods and systems for extracting features from measurement signals which are obtained from physical signals which, in turn, contain patterns of an object to be recognized.

BACKGROUND ART

The recognition of specific signatures (i.e, patterns) in images and signals has long been of interest. Powerful techniques exist for their detection and classification, but these techniques are often defeated by changes or variations in the signature. These variations often include translation and scale changes. Methods exist for transforming the signal/image so that the result is invariant to these disturbances. Translation and scaling are well understood in a mathematical sense, so it is fairly straightforward to design methods which yield a transformed form of the data wherein these effects are removed. There are other variations which are not well described mathematically or are not mathematically tractable in terms of reasonable transformations.

Time-frequency (t-f) analysis is useful for signals which exhibit changes in frequency content with time. The well known spectrogram often presents serious difficulties when it is used to analyze rapidly varying signals, however. If the analysis window is made short enough capture rapid changes in the signal, it becomes impossible to resolve signal components which are close in frequency with the analysis window duration. If the window is made long to resolve the frequencies of sinusoids, the time when sinusoidal components act becomes difficult to determine.

Until recently, there was one alternative t-f analysis technique which was widely believed to avoid some of the problems of the spectrogram. The well known Wigner distribution (WD) avoids the problems of windowing and enjoys many useful properties, but often produces an unacceptable amount of interference or cross-term activity between signal components when the signal consists of many components. Despite its shortcomings, the Wigner distribution has been employed as an alternative to overcome the resolution shortcomings of the spectrogram. It also provides a high resolution representation in time and in frequency. The WD has many important and interesting properties.

Both the spectrogram and the WD are members of Cohen's Class of Distributions. Cohen has provided a consistent set of definitions for a desirable set of t-f distributions which have been of great value in this area of research. Different members of Cohen's class can be obtained by using different kernels. In this framework, the WD has a unity valued kernel. Choi and Williams introduced the Exponential Distribution (ED), with kernel $$\Phi ED(\theta,\tau)=e^{-\theta^2\tau^2}/\sigma,$$

where $\sigma$ is a kernel parameter ($\sigma>0$). The ED overcomes several drawback of the spectrogram and WD providing high resolution with suppressed interferences.

The Reduced Interference Distribution (RID), which is a generalization of the ED, shares many of the desirable properties of the WD, but also has the important reduced interference property. RID is disclosed in U.S. Pat. No. 5,412,589, which also discloses a design procedure for Reduced Interference Distribution (RID) kernels. Generally, one may start with a primitive function, h(t), which has certain simple constraints, and evolve a full-fledged RID kernel from it. The RID kernel retains a unity value along the $\theta$ and $\tau$ axes in the ambiguity plane, generally providing good time-frequency resolution and auto-term preservation, but attenuates strongly elsewhere for good cross-term suppression.

Time-Frequency

The Wigner distribution has aroused much interest in the signal processing community. However, its use in image processing has been limited. Jacobson and Wechsler have pioneered in the use of such techniques in image processing. Cristobal et al. have investigated the use of Wigner distributions in image pattern recognition. Jacobson and Wechsler apparently have had a keen interest in human perception and the means by which images are perceived.

A more recent paper by Reed and Wechsler discusses the use of Wigner-based techniques to realize the Gestalt laws that resulted from perceptual grouping in the 1920s. It was suggested at this time that individual elements appear to group according to a set of principles including proximity, similarity, good continuation, symmetry and common fate. Reed and Wechsler go on to show that applying a relaxation procedure to the primary frequency plane of the 2D Wigner distribution is useful. Selection of the primary frequency plane reduces the representation from a N×N×N×N representation to a N×N frequency representation, of the same dimension as the original image. This is achieved by selecting pixels according to their maximum energies and retaining a number of top-ranked frequencies. Then, regions of homogeneity are grouped together. They also show that this process produces a similar end result for image textures that have the various Gestalt properties in common. This work is interesting and deserves further attention. One may conclude that the surface has been barely scratched in the application of space-spatial frequency techniques to images in general.

SUMMARY OF THE INVENTION

An object of the present invention is to provide a method and system for extracting features from measurement signals even if various versions of those signals are translated in time, translated in frequency (up or down) or scaled (expanded or compressed) in time and frequency.

Another object of the present invention is to provide a method and system for extracting features from measurement signals which are obtained by measuring real world physical signals or images which exhibit small or large changes in time translation, spatial translation, frequency translation and scale, thereby confounding present signal detection and classification methods.

Yet another object of the present invention is to provide a method and system for extracting features from measurement signals which take care of undesired extraneous variations such as noise contamination and "style" differences which have, up to now, confounded current detection and classification systems. A ready example is found in text, where letters and words may vary in size and position with an image segment being examined. Examples of complicating variations include font used, corruption during fax transmission, and printer characteristics.

Yet still another object of the present invention is to provide a method and system for extracting features from measurement signals obtained from images and other real world physical signals which can be characterized by representations invariant to time shifts, spatial shifts, frequency shifts, and/or scale changes as the situation dictates.

In carrying out the above objects and other objects of the present invention, a method is provided for extracting features from measurement signals in a pattern recognition system. Physical signals containing a pattern of an object to be recognized are measured to obtain the measurement signals. The method includes the steps of transforming the measurement signals to produce desired invariant components and extraneous variations of the measurement signals, and separating the desired invariant components from the extraneous variations to obtain the features of the pattern.

Preferably, the step of separating utilizes a noise subspace algorithm and wherein the transformed measurement signals are projected into separate subspaces based on the extraneous variations to generate a pattern recognition signal.

Also, preferably, the step of separating includes the step of recognizing a particular invariant component within the subspaces.

Further in carrying out the above objects and other objects of the present invention, a system is provided for carrying out the above method steps.

In one embodiment, the physical signals include an image containing the object. In another embodiment, the physical signals are sound signals or electrical signals and the method further includes the step of generating an energy distribution signal corresponding to spectral energy content of the sound or electrical signals, respectively. Preferably, the energy distribution signal is a time-frequency distribution signal.

The method and system are useful in a variety of applications such as speaker recognition, word spotting in speech, recognition of sonar and radar backscatter for the recognition of objects. Individual animal identification (e.g. whales and dolphins) from their sounds, recognition of particular types of firearms, recognition of particular types of machines (certain models of cars or trucks), detecting sounds and other signals associated with particular types of impending machine failure. The method and system are also useful in classifying crash signals from automotive airbag systems to distinguish true crashes from pothole and curb encounters. The method and system are useful in classifying scans of products according to their identifying codes. Many biomedical signals may also be classified using the method and system. These include brain signals such as EEGs (e.g. epilepsy) and evoked potentials, heart signals (ECG and sounds), heart valve sounds to detect failure, and joint sounds (to detect and diagnose joint problems). Image recognition, particularly character recognition and word spotting in bit-mapped documents can also be worked into this framework as can many types of medical images.

The above objects and other objects, features, and advantages of the present invention are readily apparent from the following detailed description of the best mode for carrying out the invention when taken in connection with the accompanying drawings.

DESCRIPTION OF THE DRAWINGS

FIG. 3 is a 3D graph which illustrates an autocorrelation function of 24 point Courier 'a';

FIGS. 4a and 4b are graphs which illustrate the magnitude of scale transform coefficients for Quadrants I and IV of the autocorrelation function of 24 point Courier 'a';

BEST MODE FOR CARRYING OUT THE INVENTION

In general, the method and system of the present invention provide a combination of techniques which allow scale and translation invariant transformations to be used as one step of a signature or pattern recognition process. This is followed by an approach which separates the entities to be classified into a number of subsets characterized by additional variations. The method and system identify the subset to which the specific entity at hand belongs so that classifiers specific to that subset can be used.

Figure 1:
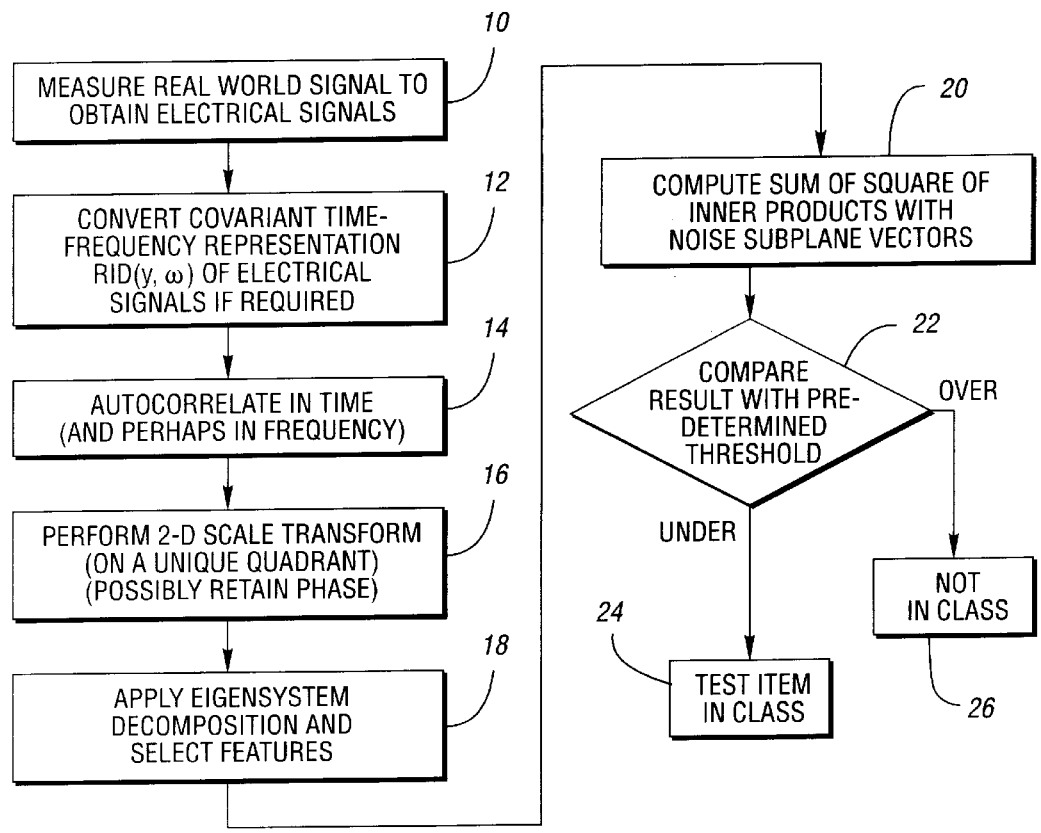
FIG. 1 is a block diagram flow chart illustrating the method and system of the present invention as applied to electrical signals which are obtained by measuring physical signals such as acoustic signals.

Referring to FIG. 1, at block 10, a real world physical signal such as a sound signal or an electromagnetic signal (such as a light signal) is first measured to obtain electrical measurement signals. The resulting measurement signals define a two-dimensional "image". This may be the actual image of an object having a pattern. A two-dimensional form of a signal representation such as a time-frequency distribution may be computed at block 12 from the electrical signals.

Classification of alphabetical characters of different fonts and sizes serves to illustrate the method and system of the present invention wherein block 12 is not required. However, the approach is quite general and may be applied to a variety of problems and signals of any dimension including time-frequency and time-space-frequency representations.

A representation termed the Scale and Translation Invariant Representation (STIR) is utilized by the method and system. It has desirable properties for pattern recognition under certain conditions. The object to be recognized should have consistent shape and appear on a constant intensity background. Using autocorrelation of block 14 and the scale transform of block 16, STIRs of patterns are identical for examples that have been translated on the background or scaled (compressed or dilated) along one or more axes.

Concepts borrowed from high-resolution spectral analysis, but adapted uniquely to the problem of classifying these STIRs have been found to be useful in this context. In high resolution frequency estimation, the noise subspace eigenvectors of the autocorrelation matrix are used. Pisarenko harmonic decomposition employs the orthogonality of the noise subspace to the signal vectors to estimate sinusoid frequencies. This idea is used in the classification of signals following STIR processing as indicated at block 18.

A standard approach to classification is to use the training data to generate templates for each class. A similarity measure, such as correlation coefficient, between the processed test data and each template is calculated and the test data is declared to be in the class corresponding to the largest similarity measure. In the noise subspace approach of the present invention, an orthogonal subspace is created for each class of training data. A measure of the projection of the test data onto each of these subspaces is calculated. Test data matching a given class should be orthogonal to the noise subspace for that class and yield a small projection measure.

The STIR and noise subspace classification steps are applied to the example of character recognition described hereinbelow. For a bitmap character input, the data are represented invariantly to translation and size, then categorized by font, and finally classified by letter. This combination of methods is applicable to many pattern recognition problems of any dimension.

Mathematical Tools for Representation

Three distinct mathematical tools are used in the development of the method. All may be applied to suitably transformed data of any dimensionality. For simplicity of explanation, the case for a 2D (i.e. two-dimensional) input signal is presented. The one-dimensional case is an obvious simplification and no additional issues are raised in the use of higher dimensional signals, so explanation based on 2D signals adequately describes the characteristics of the method and system. In addition, bitmap character data is used to demonstrate characteristics of the representations. This ties in with the example application of character recognition presented in a later section.

The mathematical tools employed typically with the help of an appropriately programmed computer are:

1D or 2D autocorrelation of the 2D representations to remove translational effects (i.e. block 14).

2D scale transformation of the autocorrelation result to remove scaling effects (i.e. block 16).

Partition of the results into subsets which reflect extraneous variations of the data (i.e. block 18).

Classification of the image involves two steps. These are:
a) Determine the subset to which the unknown image belongs, and
b) Use the classifier designed for that specific subset to classify the image.

These later two steps are performed at blocks 20, 22, 24 and 26 of FIG. 1.

Computation of the 2D Autocorrelation (i.e. Block 14)

The scale transform has been introduced by Cohen. It is a specific case of the Mellin transform with many useful and interesting properties. Signals normalized to equal energy which differ only in scale have coefficients of scale identical within a phase factor. This scale invariance property of the scale transform permits direct comparison of signals of different scale. The magnitude of the scale transform is invariant to scaling of signals, provided the transform is applied from the origin of scaling. Determining the origin from which scaling occurs is often difficult, especially when noise is present. The autocorrelation function of the signal provides a stable origin. Since the autocorrelation simultaneously sums over all points of a function, shifting of a signal on a plane does not affect the values for each lag.

It is well known that autocorrelation will remove translational effects in images and specifically in optical character recognition (OCR) methods.

The 2D autocorrelation may be carried out as follows:

$$A(k_1, k_2) = \sum_{n_1} \sum_{n_2} a(n_1, n_2) a(n_1 - k_1, n_2 - k_2) \quad (1)$$

where $a(n_1, n_2)$ is the image. The image need not be centered within the bitmap representation, which has finite support in $n_1, n_2$. Consider, for purposes of exposition, that the bitmap is infinitely padded with zeros outside of the specific bitmap support region chosen.

The 0,0 lag point provides an origin from which the autocorrelation function scales. Another feature of the 2D autocorrelation function is the symmetry $A(k_1, k_2) = A(-k_1, -k_2)$. Hence, the first and fourth quadrants together contain complete information about the entire autocorrelation lag plane. This attribute will be used in applying the scale transform of block 16.

For pattern recognition purposes, one must be aware of the loss of information which results from obtaining the autocorrelation of the signal. One wishes to remove only translation effects. Unfortunately, due to the symmetry of the autocorrelation function, an ambiguity in the orientation of the original image is introduced. The autocorrelation of an image is indistinguishable from the autocorrelation of a 180 degree rotated version of the image. This is due to the masking of phase information when the autocorrelation is applied to a signal.

Direct Scale Transform (i.e. Block 16)

The 2D autocorrelation function provides invariance to translation and a stable origin. A properly applied discrete scale transform implementation can additionally provide the desired scale invariance.

The scale transform is defined in the continuous domain as:

$$D(c) = \frac{1}{\sqrt{2\pi}} \int_0^\infty f(t) \frac{e^{-jc\ln t}}{\sqrt{t}} dt \quad (2)$$

Using a direct expansion of the scale transform, which has some advantages over a previously reported discrete scale transform, a new discrete approximation is obtained which avoids the problem of interpolating and exponentially resampling the data. Let $t = e^x$, $dt = e^x dx$. So $\sqrt{t} = e^{x/2}$. As a function of x, the scale transform becomes:

$$D(c) = \frac{1}{\sqrt{2\pi}} \int_{-\infty}^\infty f(e^x) e^{(1/2 - jc)x} dx \quad (3)$$

Signals are commonly sampled at uniform intervals. Since the value of the function is not known for all instants, calculations must be performed based on values at the sampled points of the signal. In this discrete approximation, the signal is assumed to remain constant between samples.

Assume that the signal is sampled every T units. Since, by linearity, an integral may be broken into a summation of integrals over smaller regions, one may break the integral into logarithmic intervals. This choice of interval width in conjunction with the approximation of constant value over each interval permits calculation using only the sampled points of f(t). Splitting the integral into logarithmic intervals yields:

$$D(c) = \frac{1}{\sqrt{2\pi}} \left\{ \int_{-\infty}^{\ln T} f(e^x) e^{(1/2-jc)x} dx + \right. \quad (4)$$
$$\int_{\ln T}^{\ln 2T} f(e^x) e^{(1/2-jc)x} dx +$$
$$\int_{\ln 2T}^{\ln 3T} f(e^x) e^{(1/2-jc)x} dx +$$
$$\left. \int_{\ln 3T}^{\ln 4T} f(e^x) e^{(1/2-jc)x} dx + \ldots \right\}$$

$$D(c) \approx \frac{1}{\sqrt{2\pi}} \left\{ f(e^{-\infty}) \int_{-\infty}^{\ln T} e^{(1/2-jc)x} dx + \right. \quad (5)$$
$$f(e^{\ln T}) \int_{\ln T}^{\ln 2T} e^{(1/2-jc)x} dx +$$
$$f(e^{\ln 2T}) \int_{\ln 2T}^{\ln 3T} e^{(1/2-jc)x} dx +$$
$$\left. f(e^{\ln 3T}) \int_{\ln 3T}^{\ln 4T} e^{(1/2-jc)x} dx + \ldots \right\}$$

$$D(c) \approx \frac{1}{\sqrt{2\pi}} \left\{ f(0) \left[ \frac{(T)^{1/2-jc}}{1/2 - jc} \right] + f(T) \left[ \frac{(2T)^{1/2-jc} - (T)^{1/2-jc}}{1/2 - jc} \right] + \right. \quad (6)$$
$$f(2T) \left[ \frac{(3T)^{1/2-jc} - (2T)^{1/2-jc}}{1/2 - jc} \right] +$$
$$\left. f(3T) \left[ \frac{(4T)^{1/2-jc} - (3T)^{1/2-jc}}{1/2 - jc} \ldots \right] \right\}$$

Simplifying the above equation yields the following algorithm for direct calculation of the discrete scale transform:

$$D(c) \approx \left( \frac{1}{(1/2 - jc)\sqrt{2\pi}} \right) \sum_{k=1}^{\infty} [f(kT - T) - f(kT)](kT)^{1/2-jc} \quad (7)$$

Since the scale transform is based on exponential sampling relative to the origin, the entire autocorrelation plane cannot be dealt with at one time. Since both lag values in the first quadrant index from zero in the first quadrant, the scale transform may be directly applied. The lag axes in the fourth quadrant, however, aren't both positive, so reindexing is necessary. For each quadrant, the axes must be included, since the scale transform indexing is based relative to the origin. Hence, define two discrete quadrant functions as follows:

$$Q_1(k_1, k_2) = A(k_1, k_2) \text{ for } k_1, k_2 \geq 0 \quad (8)$$
$$Q_2(k_1, k_2) = A(k_1, -k_2) \text{ for } k_1 \geq 0, k_2 \leq 0 \quad (9)$$

Since it is not possible to calculate the scale coefficient D(c) for every scale, c, a set of scales is chosen. The scales and interval parameter, T, are selected such that a unique representation is generated for each class of inputs.

A 2D scale transform approximation is implemented by applying a 1D scale transform algorithm of equation (7) first to the rows then to the column of a matrix of values. Applying such a 2D scale transform to $Q_1$ and $Q_2$ and taking the magnitude of the result yields two 2D matrices of scale coefficients. The size of these matrices is determined by the number of row and column scale values selected.

Since the autocorrelation function input was not energy normalized, normalization of the scale magnitudes is required for a scale invariant representation. Since the scale transform is a linear transform, normalization may be done by a variety of methods to generate an appropriate result.

The normalized scale transformed quadrant functions represent a STIR of the original 2D input. Since only selected scale transform magnitudes are computed, the transform is not invertible. In addition to providing a scale invariant representation, other signal information is lost. The usefulness of the STIR is dependent on its implementation and application. For the very common case of a 2D function sampled into a matrix of discrete values, a usable classification scheme which can be used with STIRs as the inputs has been developed as described below.

Classification of Patterns

In addition to the invariances, STIRs have the desirable property that for a fixed set of row and column scales, the sizes of all STIR matrices are identical, regardless of the size of the input matrices. Hence, inputs from different sources may be treated identically once processed into STIR images.

The initial approach taken to classify patterns was to decompose the STIR images to provide an orthogonal set of descriptors. The Karhonen-Loève transform is commonly mentioned as a means of accomplishing this. In OCR methods, this is a well known approach. The singular value decomposition (SVD) provides equivalent results. The STIRs of each character were reshaped into a single vector by concatenating the rows of the two STIR matrices. The specific mapping of elements from the matrices to row vector is of no importance as long as the values are unchanged. This vector contains all the information of the STIR, but in a more convenient form for processing. The row vectors were "stacked" forming a new matrix representing all characters of interest for a range of sizes and various fonts. The SVD was then applied to extract essential features of the set of vectors. Right singular vectors corresponding to the largest singular values were chosen as features. Correlation coefficients between test STIR vectors and the selected features were used for classification. Unfortunately, in the case of character recognition, classification results were not impressive.

An idea may be borrowed from matrix theory and methods developed for high resolution spectral analysis. Suppose one has C characters to be recognized and V variations of those characters. Then, there are M=CV exemplars of the members of the subset. When the SVD analysis is performed on each character individually, V singular vectors provide a complete basis for the set of exemplars. The number of elements in the exemplar vectors is set to be larger than the number of exemplar vectors by selecting the row and column scales in the scale transform. The SVD will yield a larger number of orthonormal vectors than there are exemplars. The V+1th singular vector will be orthogonal to the singular vectors which form a basis for the set of V exemplars as will be the V+2, V+3, V+4, ... singular vectors.

These are so-called "noise" vectors. The inner product of any one of these noise vectors with any of the basis vectors will yield a zero result. Since each exemplar is formed from the set of basis vectors, it too will yield a zero inner product with the noise vectors. This provides a method for character classification. Take the inner product of the test STIR vector with a noise vector of the candidate character subset. If the result is zero, then the STIR vector must be a member of the corresponding character subset. In practice, due to noise or variations in the bitmaps, one may not obtain a zero inner product with the correct character noise vectors However, the inner product of the unknown character vector with the noise vectors' correct character subset will produce the smallest magnitude result when compared to inner products between the unknown character and noise vectors of the incorrect character subset.

Application: Multifont Character Classification

This example shows how STIR and the SVD noise subspace index are combined to perform as a size independent multifont character classifier. A complete character recognition system incorporates much more than the pattern classifier presented here. This application is presented to show the viability of the method for pattern classification. The approach taken for identification of characters in various fonts consists of two steps: font determination and character identification. Both steps use the STIRs and noise subspace methodology. Specifically omitted is the significant task of segmentation of an image into individual character bitmaps. Each bitmap is considered to be an isolated recognition task. Contextual information such as positioning within a word or line, adjacent characters, and character frequency is not used.

Figure 2:
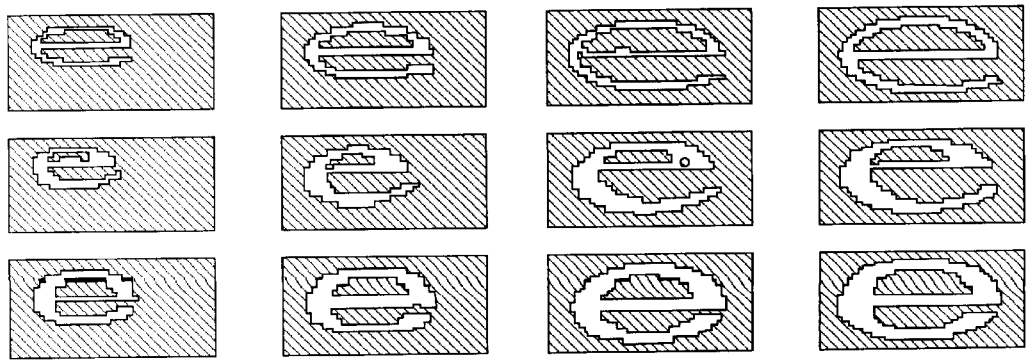
FIG. 2 is a matrix of images which illustrate the letter 'e' in fonts Courier, Helvetica, Times (top to bottom, respectively,) in point sizes 14, 18, 24, 28 (left to right, respectively)

The character set consists of the lowercase letters. Courier, Helvetica, and Times were the fonts examined. Text in sizes 14, 18, 24, and 28 point in each font was used for training. Bitmaps from faxed versions of clean printed copy were used as the input signals. The text consisted of one instance of each character in each font and size combination. Bitmaps of the letter "e" in the various font and training size combinations appear in FIG. 2.

The classification methodology was tested on 20 point faxed characters in each of the fonts. Hence, the recognition tool is being tested on a size of text different from any size used in training. In this character recognizer, font is determined first. For each font, exemplars in the four training sizes are available for each of the 26 characters, a total of 104 training characters.

Figure 5:
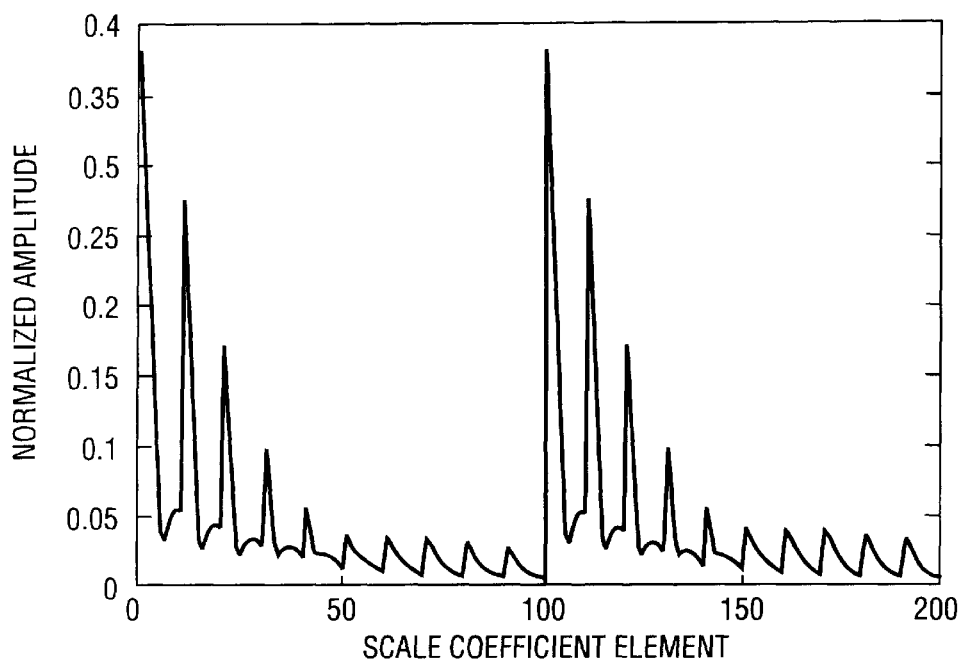
FIG. 5 is a graph which illustrates a scale and translation invariant representation vector for a 24 point Courier 'a'.

Every STIR row vector is generated by the steps of autocorrelation (block 14), scale transform (block 16), and reshaping to a vector. To illustrate, consider a 24 point Courier letter "a" bitmap. Figure shows its autocorrelation. The first and fourth quadrants are scale transformed using an interval distance T=1 with row and column scale values of 0.1, 0.4, 0.7, 1.0, 1.3, 1.6, 1.9, 2.2, 2.5, 2.8. FIGS. 4a and 4b show the matrices of magnitudes of these scale transform coefficients, the STIR values. The scale values are very similar for each quadrant. That is characteristic of the scale coefficient magnitudes for most functions. The magnitudes drop off roughly exponentially. These coefficient magnitudes reformed as a STIR row vector gives the appearance shown in FIG. 5.

Font was classified using STIR training vectors from three matrices, one for each font. Considering each font as a single class implies an SVD on 104 STIR vectors. Since, for each font, there are four sizes each of the 26 letters. The length of each row is determined by the number of row and column scales chosen for calculation. The STIR row vectors each have 200 elements because, choice of row and column scales in the scale transform dictates a 10 by 10 matrix output for each autocorrelation quadrant. Thus, the SVD for each font will yield noise vectors corresponding to 96 singular values with zero magnitude. Calculating the sum of inner product magnitudes between these orthogonal vectors and a test STIR vectors yields a selection value for each font as indicated at block 20. If the result is zero, then the unknown character must be represented in that font. In practice, one does not obtain a zero inner product with the correct font noise vectors. However, the correct font should correspond to the matrix generating the smallest selection value as indicated at block 24.

The 20 point test characters in each of the three fonts were processed into STIR vectors and classified by smallest selection value. This worked perfectly. In all 78 test characters, the font was correctly classified.

Character Determination

Once font is known, classification of the character follows the same method as classification of font. Twenty-six matrices are generated, one for each letter in the selected font. All scale transform parameters are the same as used in font classification. All STIR vectors of each training size are stacked to form a 4 by 200 matrix for each letter. SVDs were performed on each matrix. The right singular vectors corresponding to zero singular values were retained for selection value calculation. Each test input was processed into a STIR vector and its selection value was calculated for all 26 sets of noise vectors. The input was classified as the character corresponding to the set of noise vectors generating the smallest selection value.

Figure 6:
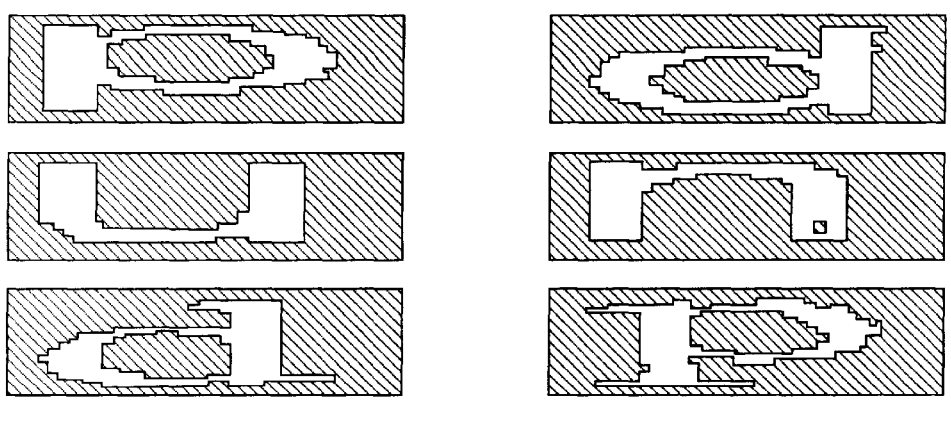
FIG. 6 is a matrix which illustrates test characters (20pt) involved in misclassification: Helvetica 'p' and 'd' (top row), Helvetica 'u' and 'n' (middle row), Times 'd' and 'p' (bottom row)

Of the 78 test characters, 3 were incorrectly classified. All Courier characters were correctly classified. In Times, the "n" was classified as a "u" and the "p" was classified as a "d". In Helvetica, the "d" was classified as a "p". Confusion between "d"/"p" and "u"/"n" is expected since the STIR approach does not discriminate between 180 degree rotated versions of letters. In a complete character recognition engine, additional structural examination would be employed to discriminate between these characters. FIG. 6 shows the bitmaps of the 20 point confused letters.

This example shows the potential for application of the STIR and noise subspace discrimination to character recognition. A selection value threshold is added to reject symbols which are not among the valid set of characters as indicated at block 22. A pattern recognition signal is generated in the form of a vector which describes: Yes—same pattern, or No—different pattern.

Simulations involving variations such as larger character sets, smaller font sizes, and added shot noise show that this method degrades gracefully: Errors in font classification are often still followed by correct character classification; more misclassification between similar characters occurs; classification errors increase proportionally with amounts of speckle.

The method and system of the present invention is general. It can be used to represent and classify patterns of any dimension. An extension of the method is to space-spatial frequency representations. Once in the STIR vector representation, the processing time required is identical for all sizes of inputs because the STIR vector length is determined by the number of row and column scale coefficients selected, not by the size of the bitmap input. For maximum processing speed, this number may be set to the smallest value which provides the required classification ability.

The character recognition example could easily have been a parts classification example, a word spotting example, etc. In fact, the same basic methodology can be extended to time-frequency representations (TFRs) of signals by treating the TFRs as images. Invariance would be realized for time shift, frequency shift, and scale changes.

Acoustic Signals

Two types of acoustic signals were used to test the effectiveness of the method and system of the present invention. These were human speech and marine mammal sounds.

Marine Mammal Sounds

Marine mammal sounds are well characterized using the RID and overcome some of the shortcomings of the SP as described by Watkins. RID clearly reveals both the tonal structure in the whistles and the temporal structure of clicks which are simultaneously produced by these animals. It appears that the clicks of marine mammals such as whales and dolphins may have a distinctive structure based on the individual animal and may be useful in nonintrusive tagging and tracking of these animals. Our new TFD methods provide a powerful means of representing the complex sounds produced by marine mammals.

One can now readily design TFDs, which represent the joint energy of a signal as a function of time and frequency or space-frequency distributions which represent the joint energy of images as space-spatial frequency distributions (two spatial variables x and y and two spatial frequency variables $\Omega_x$ and $\Omega_y$). Furthermore, with careful design, these joint distributions can exhibit proper covariances with time, frequency or spatial shifts such that the representation shifts in accordance with these shifts but does not change in its configuration. The well known spectrogram has been extensively used in speech analysis and it has these useful properties. A shift in time or a shift in frequency of the signal will shift the representation appropriately in time and frequency. However, the spectrogram does not exhibit the proper characteristics in response to scale changes in the signal.

Figures 7A, 7B, 7C:
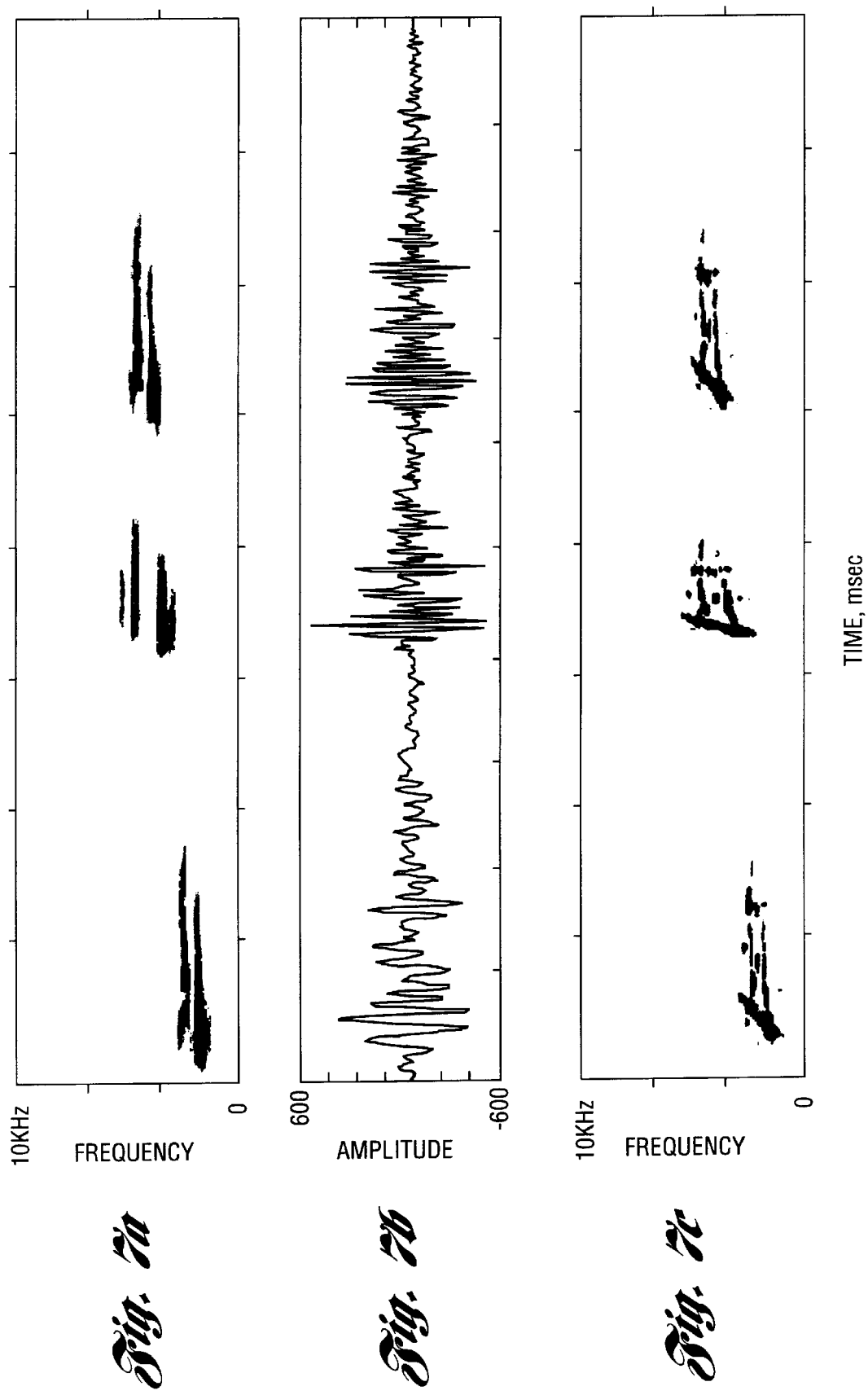
FIGS. 7a–7c are graphs which illustrate TFD results for time shifted, frequency shifted and scaled dolphin click: 7(a) spectrogram; 7(b) original click, scaled and time shifted click, time shifted and frequency shifted click, 7(c) Reduced Interference Distribution (RID) click results for the same time shifts, scaling and frequency shift.

That is, if x(t) becomes x(at), the Fourier transform of x(t) changes from X(ω) to 1/a X (ω/a). This is illustrated in FIGS. 7a–7c wherein FIG. 7a is a spectrogram; FIG. 7b is the original signal; and FIG. 7c is a scale-covariant RID.

Speech Processing

The spectrogram has long been a widely used tool in speech analysis. Other TFDs have been investigated in speech analysis, but not have yet provided a strong advance beyond the level of analysis provided by the spectrogram. It is generally believed that the potential exists for significant advances in speech analysis recently developed by TFD tools, however.

Classification and Detection of Acoustic Signals

Acoustic signals may vary in time of occurrence, frequency, and scale. The Doppler effect manifests itself as scaling. The "scalogram", which is an analog of the spectrogram with frequency replaced by scale, might be effective in analyzing scaled signals. However, it, as does the wavelet transform, lacks the frequency covariance property. One might like to have invariant representations under time-shift, frequency-shift, and scale. The techniques described herein may be assembled to achieve all of these invariances. First, the sound or a segment of the sound to by analyzed must be isolated as illustrated by block 10 in FIG. 1. Next, the RID is computed as indicated at block 12. Then, the autocorrelation along time is performed as:

$$A_{RID}(m, k) = \sum_n RID(n, k)RID(n - m, k) \tag{10}$$

wherein n is the time sample, k is the frequency sample, and m is the autocorrelation lag sample as indicated at block 14. This removes absolute time and produces a centered autocorrelation of each frequency slice. Next, one has the choice of also removing absolute frequency by performing a similar autocorrelation along k. Finally, one may scale transform the resulting representation along the time and frequency directions as indicated at block 16. This serves to produce a representation that is invariant to time, frequency and scale shifts.

It may not be desirable to remove all variation. These variations may serve to classify or detect the signal. For example, if frequency shift is an important indicator of the identity of a signal, one may bypass that step. It is important to note that even though these techniques serve to make the representations invariant, true frequency shifts and scale shifts may be retained in the phases of the requisite transforms.

Sound Classification Using the Invariant Representations

Starting with a suitable TFD (e.g., RID), almost all of the undesired variation due to time shift, frequency shift, and scale may be squeezed out of the final invariant form. There may still be some residual effects due to discretization and computation. The next task is to design a classifier. Suppose that the invariant form is characterized by a two-dimensional representation Δ(p,q). This 2-D representation may be decomposed using eigensystem techniques as:

$$\Delta(p, q) = \sum_j a_j \beta_j(p, q) \tag{11}$$

where the $\beta_j(p,q)$ are eigenimages and the $a_j$ are the eigenvalues of the decomposition as illustrated at block 18. The eigensystem decomposition is carried out on a collection of Δ(p,q) examples coming from the classes of objects (signals or images) that are of interest. The eigensystem decomposition then provides an ordered set of eigenimages ordered according to their eigenvalues.

The 2-D N×M invariant forms may be converted into vectors of length N×M by either concatenating the rows or columns. Then, readily available Singular Value Decomposition (SVD) techniques may be applied to the vectorized set of images. Suppose there are several different extraneous variations in the supposedly invariant representations caused by a variety of factors For example, the same person may not say the same word exactly the same way each time or the same whale or dolphin may click slightly differently each time. Such extraneous variations often confound the invariant representations so that effective detection or classification of a specific signal or image is rendered impossible. A new and very effective method using noise subspace concepts has been developed to overcome these problems as previously described.

Noise Subspace Methods

The N×M vectorized 2-D forms have a large number of elements. Usually, for classification methods to work, one wishes to have a considerably greater number of representations of the signal vectors than there are elements in those representations. Here, we have exactly the opposite. There are many more elements in the vectorized 2-D forms than there are vectorized 2-D forms. This is usually a statistical nightmare. However, suppose there are K sound examples (K<<N×M). Then, the SVD produces N×M orthogonal eigenvectors, the first K of which form a complete orthonormal basis for the vectorized invariant forms. The remaining SVD eigenvectors (the noise eigenvectors) must be orthogonal to all of the original vectorized invariant forms. Suppose that we now obtain a new signal. Convert it into the TFD, then to the 2-D invariant form and finally, vectorize the 2-D invariant form. It belongs to the set of vectorized 2-D invariant forms used to produce the SVD results, then it should be orthogonal to all of the noise eigenvectors produced by the SVD. Therefore, its projection on any of the noise eigenvectors should be zero. If we have carried out the whole process through the SVD for a number of different sets of signals, we should find the projection of the vectorized 2-D invariant form of the unknown signal on the noise eigenvectors of each set of signals. The smallest result will be theoretically obtained when this is done using the noise eigenvectors of the set to which the signal belongs.

SUMMARY OF METHOD

The method may be best summarized by a block diagram of the technique. This is shown in FIG. 1. Not all of the invariance transformations may be desirable for a given situation. For example, if the specific pitch of speech is important in identifying an individual or detecting men or women or adults or children, then one would not like to render the STIR invariant to frequency translation. The scale transform phase is discarded in the basic detection/recognition algorithm. However, it carries the specific scale of the signal which may also be useful in detection/classification. Combinations of various levels of invariant representations may be useful in sorting out the truth.

While the best mode for carrying out the invention has been described in detail, those familiar with the art to which this invention relates will recognize various alternative designs and embodiments for practicing the invention as defined by the following claims.

What is claimed is:

1. A method of classifying an object represented by object signals containing a pattern of the object, the method comprising:
    creating a noise subspace for at least one object class;
    transforming the object signals to produce an object vector;
    projecting the object vector onto the noise subspace for each object class; and
    determining that the object represented by the object signals is a member of the object class based on the projection of the object vector onto the noise subspace.

2. A method of classifying an object as in claim 1 wherein each object class is defined using at least one exemplar vector, each exemplar vector having a number of elements greater than the number of exemplar vectors defining the object class.

3. A method of classifying an object as in claim 1 wherein the noise subspace comprises at least one vector normal to at least one exemplar vector, each exemplar vector based on an object representative of the object class.

4. A method of classifying an object as in claim 1 wherein the at least one object class is a plurality of object classes, determining that an object is a member of an object class comprising determining the object class with the minimum noise subspace projection.

5. A method of classifying an object as in claim 1 wherein transforming comprises scale transformation.

6. A method of classifying an object as in claim 1 wherein transforming comprises autocorrelation.

7. A method of classifying an object as in claim 1 wherein transforming comprises producing a scale and translation invariant representation (STIR).

8. A method of classifying an object as in claim 1 wherein the object is a character, the method further comprising:
    determining that the object is a member of a font object class based on the projection of the object vector onto the noise subspace of at least one font class; and
    determining that the object is a member of a character class based on the projection of the object vector onto the noise subspace of at least one character class.

9. A method of classifying an object as in claim 1 wherein transforming comprises obtaining the reduced interference distribution (RID).

10. A method of classifying an object as in claim 1 wherein creating a noise subspace comprises:
    obtaining a plurality of exemplar signals;
    forming a vector representation for each exemplar signal;
    forming an invariant transform matrix from the vector representations, the matrix having a greater number of elements in each vector than the number of vector representations;
    obtaining a singular value decomposition (SVD) of the matrix; and
    defining the noise subspace as eigenvectors not forming a complete orthonormal basis.

11. A method of classifying an object as in claim 1 wherein the object signals comprise an image containing the object.

12. A method of classifying an object as in claim 1 further comprising generating an energy distribution signal corresponding to spectral energy content of the object signals and wherein transforming is performed on the energy distribution signal.

13. A method of pattern recognition comprising:
    generating at least one noise subplane vector;
    measuring signals representative of a pattern;
    performing at least one invariant transformation on the measured signals;
    measuring the orthogonality of the transformed signals and each noise subplane vector; and
    recognizing the pattern based on the measured orthogonality between the transformed signals and each noise subplane vector.

14. A method of pattern recognition as in claim 13 wherein the pattern is recognized if the measured orthogonality is greater than a predetermined threshold.

15. A method of pattern recognition as in claim 13 wherein a pattern is to be recognized as one of a plurality of patterns, generating at least one noise subplane vector comprises generating at least one noise subplane vector for each of the plurality of patterns and recognizing a pattern comprises determining as a recognized pattern the pattern having the greatest orthogonality between the transformed signal and each noise subplane vector generated for the recognized pattern.

16. A method of pattern recognition as in claim 13 wherein performing at least one invariant transformation comprises converting the measured signals to a covariant time-frequency representation.

17. A method of pattern recognition as in claim 13 wherein performing at least one invariant transformation comprises autocorrelation in time.

18. A method of pattern recognition as in claim 13 wherein performing at least one invariant transformation comprises autocorrelation in frequency.

19. A method of pattern recognition as in claim 13 wherein performing at least one invariant transformation comprises autocorrelation in space.

20. A method of pattern recognition as in claim 13 wherein performing at least one invariant transformation comprises scale transformation.

21. A method of pattern recognition as in claim 13 wherein performing at least one invariant transformation comprises producing a scale and translation invariant representation (STIR).

22. A method of pattern recognition as in claim 13 wherein the pattern is a character, the method further comprising:
    determining that the pattern is a member of a particular font based on the measured orthogonality of the transformed signals and noise subplane vectors for each font; and
    determining that the pattern is a particular character based on the measured orthogonality of the transformed signals and noise subplane vectors for each character in the particular font.

23. A method of pattern recognition as in claim 13 wherein performing at least one invariant transformation comprises obtaining the reduced interference distribution (RID).

24. A method of pattern recognition as in claim 13 wherein generating at least one noise subplane vector comprises:
    obtaining a plurality of exemplar signals;
    forming a vector representation for each exemplar signal;
    forming an invariant transform matrix from the vector representations, the matrix having a greater number of elements in each vector than the number of vector representations;

obtaining a singular value decomposition (SVD) of the matrix; and defining each noise subplane vector as an eigenvector not forming a complete orthonormal basis.

25. A method of pattern recognition as in claim 13 wherein the signals representative of a pattern comprise an image containing the pattern.

26. A method of pattern recognition as in claim 13 further comprising generating an energy distribution signal corresponding to spectral energy content of the signals representative of a pattern and wherein the at least one invariant transformation is performed on the energy distribution signal.

27. A system for classifying an object represented by object signals containing a pattern of the object, the system comprising:

means for creating a noise subspace for at least one object class;

means for transforming the object signals to produce an object vector; means for projecting the object vector onto the noise subspace for each object class; and means for determining that the object represented by the object signals is a member of the object class based on the projection of the object vector onto the noise subspace.

* * * * *